(12) United States Patent
Reisz

(10) Patent No.: US 11,007,665 B2
(45) Date of Patent: May 18, 2021

(54) PROVIDING A CUTTING AREA WITH WEB-LIKE INTERLEAVER MATERIAL

(71) Applicant: Weber Maschinenbau GmbH Breidenbach, Breidenbach (DE)

(72) Inventor: Carsten Reisz, Breidenbach (DE)

(73) Assignee: Weber Maschinenbau GmbH Breidenbach

( * ) Notice: Subject to any disclaimer, the term of this patent is extended or adjusted under 35 U.S.C. 154(b) by 106 days.

(21) Appl. No.: 16/041,037

(22) Filed: Jul. 20, 2018

(65) Prior Publication Data

US 2019/0152085 A1 May 23, 2019

(30) Foreign Application Priority Data

Aug. 18, 2017 (DE) ...................... 10 2017 118 921.1

(51) Int. Cl.
*B26D 7/32* (2006.01)
*B65B 25/08* (2006.01)
(Continued)

(52) U.S. Cl.
CPC .......... *B26D 7/325* (2013.01); *A22C 17/0033* (2013.01); *B65B 25/08* (2013.01);
(Continued)

(58) Field of Classification Search
CPC ..... B25D 7/325; A22C 17/0033; B65B 25/08; B65H 16/021; B65H 16/028;
(Continued)

(56) References Cited

U.S. PATENT DOCUMENTS 8,707,840 B2 * 4/2014 Weber ...................... B26D 5/20
83/508.2
8,892,239 B2 * 11/2014 Weber ...................... B26D 7/28
700/171
(Continued)

FOREIGN PATENT DOCUMENTS

DE 102011106459 A1 1/2013
DE 102013216717 A1 2/2015
(Continued)

OTHER PUBLICATIONS

European Search Report for European Application No. 18182908.6 dated Nov. 15, 2018, 3 pages.
(Continued)

*Primary Examiner* — Chelsea E Stinson
*Assistant Examiner* — Himchan Song
(74) *Attorney, Agent, or Firm* — Dickinson Wright PLLC

(57) ABSTRACT

The invention relates to a method for a multitrack provision of web-like interleaved sheet material at a cutting region in which products supplied on multiple tracks are cut into slices and interleaved sheets are introduced which are cut off from the provided interleaved sheet material in the cutting region and for which a normal length is predefined which is dependent on the respective application, in which material webs are removed from at least two material stores which are each associated with one or more tracks; and in which the material consumption of at least one material store is impacted during operation, in particular in dependence on residual quantities in the material stores, in that the length of the interleaved sheets is varied in the respective track or tracks with respect to the normal length at least for this material store.

17 Claims, 6 Drawing Sheets

Figure 1:
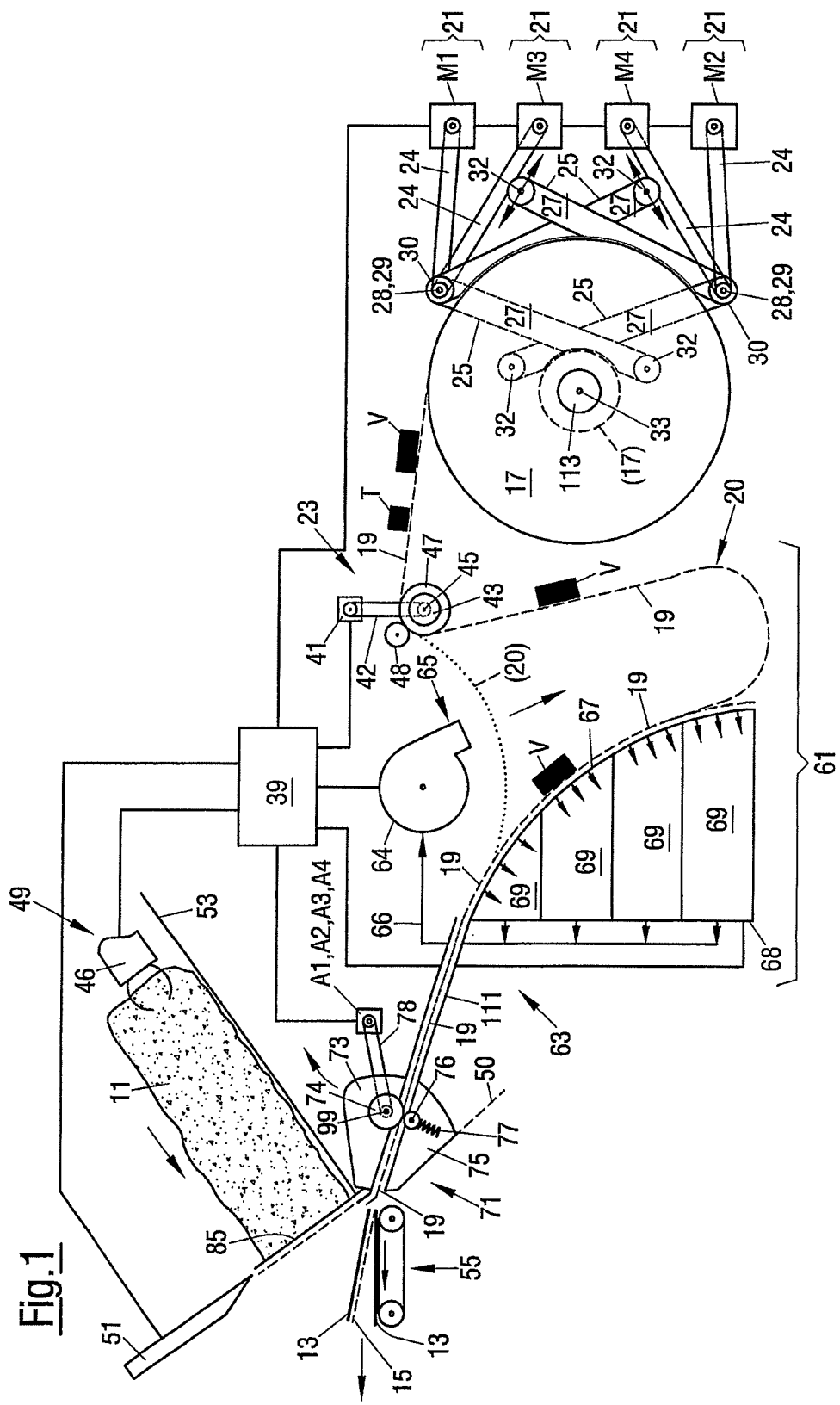

(51) Int. Cl.
*A22C 17/00* (2006.01)
*B65H 19/18* (2006.01)
*B65H 16/10* (2006.01)
*B65H 35/08* (2006.01)
*B65H 16/02* (2006.01)
*B65H 35/00* (2006.01)
*B26D 7/01* (2006.01)

(52) U.S. Cl.
CPC ......... *B65H 16/021* (2013.01); *B65H 16/028* (2013.01); *B65H 16/106* (2013.01); *B65H 19/1852* (2013.01); *B65H 35/0066* (2013.01); *B65H 35/08* (2013.01); *B26D 2007/011* (2013.01); *B26D 2210/02* (2013.01); *B65H 2301/41394* (2013.01); *B65H 2301/41398* (2013.01); *B65H 2301/44322* (2013.01); *B65H 2406/311* (2013.01); *B65H 2408/214* (2013.01); *B65H 2511/11* (2013.01); *B65H 2511/112* (2013.01); *B65H 2511/114* (2013.01); *B65H 2511/142* (2013.01)

(58) Field of Classification Search
CPC .............. B65H 16/106; B65H 35/0066; B65H 2301/41394; B65H 2301/41398; B65H 2511/114; B65H 2511/142
USPC ........................................................... 53/157
See application file for complete search history.

(56) References Cited

U.S. PATENT DOCUMENTS

| | | | | |
|---|---|---|---|---|
| 9,914,237 | B2* | 3/2018 | Koster | B26D 7/27 |
| 2004/0244552 | A1* | 12/2004 | Weber | B26D 7/325 |
| | | | | 83/469 |
| 2012/0073249 | A1* | 3/2012 | Pryor | B65B 41/12 |
| | | | | 53/514 |
| 2015/0053057 | A1* | 2/2015 | Dreier | B65B 25/08 |
| | | | | 83/42 |
| 2016/0023370 | A1* | 1/2016 | Muller | B65H 26/00 |
| | | | | 83/88 |
| 2019/0047168 | A1* | 2/2019 | Bialy | B65B 25/06 |
| 2019/0329438 | A1* | 10/2019 | Bader | B65H 35/08 |

FOREIGN PATENT DOCUMENTS

| | | |
|---|---|---|
| EP | 1441883 A1 | 8/2004 |
| EP | 2848380 A1 | 3/2015 |

OTHER PUBLICATIONS

Official Communication from the German Patent and Trademark Office for related German Application No. 102017118921.1; dated Jul. 23, 2018; 2 pages.

* cited by examiner

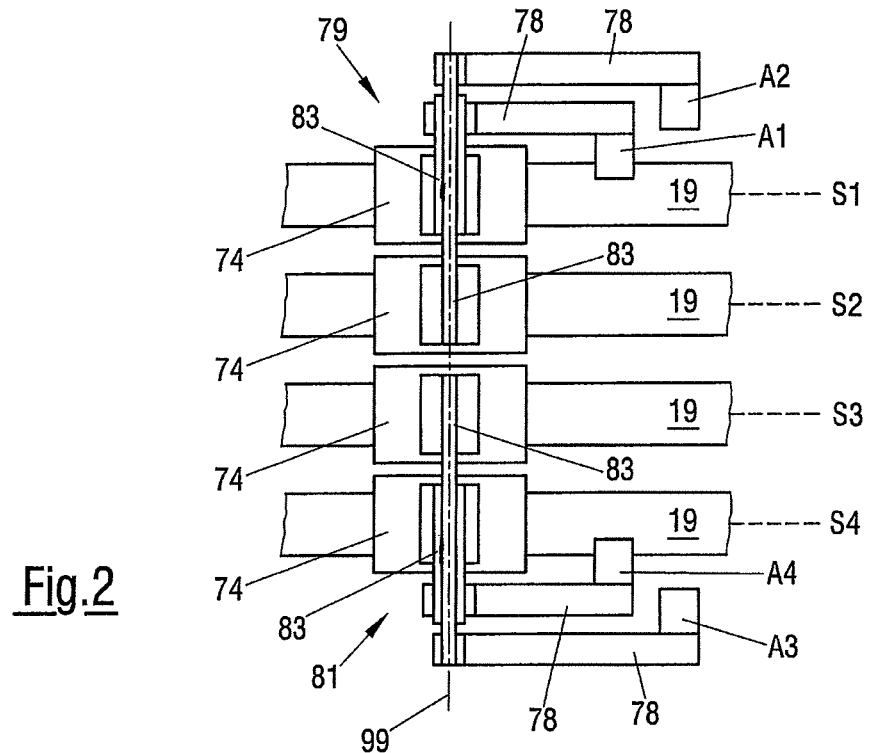
Fig.2
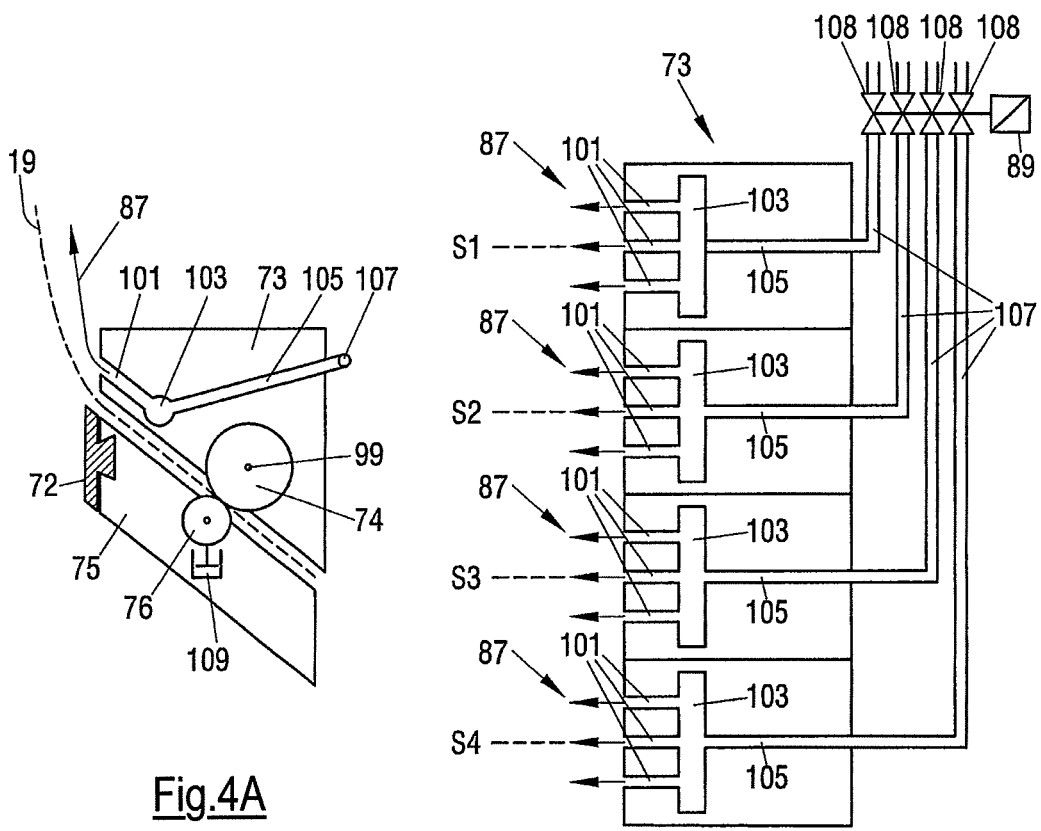
Fig.4A
Fig.4B

PROVIDING A CUTTING AREA WITH WEB-LIKE INTERLEAVER MATERIAL

The invention relates to an apparatus for a multitrack provision of web-like interleaved sheet material at a cutting region in which products supplied on multiple tracks are cut into slices and interleaved sheets are introduced which are cut off from the provided interleaved sheet material in the cutting region and for which a normal length is predefined which is dependent on the respective application. In this method, material webs are removed from at least two material stores which are each associated with one or more tracks.

Such methods and apparatus for their execution are generally known in the field of the slicing of food products.

In the cutting region, slices cut off from the products can consequently be provided with the interleaved sheets introduced into the cutting region. In this respect, either interleaved sheets can be introduced between a respective two directly consecutive slices or interleaved sheets can be introduced beneath a respective slice and thus between this slice and a support surface of this slice. A respective interleaved sheet is then, for example, located beneath the lowest slice of a portion on the formation of portions from a plurality of slices. Such an underleaver function, however, does not preclude that, on the formation of portions, a respective interleaved sheet is not only disposed beneath the lowest slice, but one or more interleaved sheets are also introduced between a respective two consecutive slices within the portion. Independently of whether an underleaver function is provided or not, a respective interleaved sheet can generally be introduced within a portion either between each pair of directly consecutive slices or only between one or more pairs of directly consecutive slices, e.g. between every nth pair, where n>1.

Such apparatus are generally known in the field of the slicing of food products and are also called interleavers or underleavers. An interleaver can in this respect—as mentioned above—also perform an underleaver function and vice versa. The present disclosure therefore not only applies to the interleavers primarily explained here or to the provision of interleaved sheets or interleaved sheet material, but also to so-called underleavers which serve to place a sheet beneath products. It is ensured by such an underleaved sheet feed that at least the total lower side of the products does not directly lie on a support surface, for example, on a conveying device. When only the term "interleaver" is used in each case in the following, the respective statements and the respective disclosure—where sensible—will also apply to an "underleaver". As already mentioned, one and the same apparatus for the provision of interleaved sheet material or of interleaved sheets can perform both an interleaver function and an underleaver function in dependence on the respective application, i.e. an interleaver is simultaneously also an underleaver, and vice versa, within the framework of this disclosure.

If the interleaved sheet material should be provided at the cutting region for a plurality of tracks, a material web is required at the cutting region for each track. It is possible to provide a common material store for a plurality of tracks. To produce individual material webs, a device can be provided for dividing the material web which forms the respective material store into the required number of individual material webs. This is generally known. The material stores can in particular each be a rotatably supported material roll.

The invention also relates to an apparatus for a multitrack slicing of food products, having a product feed which simultaneously supplies products to be sliced to a cutting region in which a cutting blade moves in a rotating and/or revolving manner to simultaneously cut the supplied products into slices; and having an interleaver or underleaver in accordance with the invention.

Such cutting apparatus are also called slicers or high-speed slicers, the latter against the background that bar-like or loaf-like food products can e.g. be sliced by such machines at high cutting speeds of several hundred to some thousand slices per minute. In many applications, stacked or overlapping portions are, for example, formed from the cut-off slices falling onto a support surface e.g. formed by a portioning belt. An interleaver, for example, serves to introduce interleaved sheets between directly consecutive slices of a portion so that the slices can later be separated from one another and/or gripped more easily. Paper or a plastic film, for example, serves as the material for the interleaved sheets.

In accordance with the progress in the development of cutting machines, in particular with respect to speed, accuracy and variety, ever higher demands are also made on the interleavers or underleavers. Known interleaver or underleaver concepts which generally provide satisfactory results frequently no longer meet these increased demands.

There is consequently a need for an improved interleaver or underleaver technology in particular in the field of the slicing of food products by means of high-speed slicers. In particular the operation of interleavers or underleavers on multiple tracks and individually per track is more and more in the foreground.

It is a problem of the known multitrack interleavers or underleavers that the individual material stores are frequently consumed at different speeds. Different times for replenishing the stores, e.g. by replacing the material rolls, result from this. For instance, it may occur that a material roll has to be replaced in a track and that the operation of the interleaver or underleaver, and consequently also of the slicer, has to be interrupted for this purpose although work could be continued in the other interleaver or underleaver tracks. Time losses hereby occur which result in a disadvantageous reduction of the product throughput of the slicer. This is in particular problematic when a material roll which is not directly accessible has to be replaced. In an interleaver or underleaver comprising more than two material rolls, it is also not possible to provide a remedy here in that an accessibility from two sides is provided, which would anyway frequently not be able to be carried out in practice for other reasons.

It is therefore the object of the invention to improve the multitrack provision of web-like interleaved sheet material to the extent that operating interruptions of the interleaver or underleaver due to the filling of the material stores are minimized.

This object is satisfied by the features of the independent claims.

Provision is made in the method in accordance with the invention that the material consumption of at least one material store is impacted during operation, in particular in dependence on residual quantities in the material stores or on already consumed quantities, in that the length of the interleaved sheets is varied in the respective track or tracks with respect to the normal length at least for this material store.

The material consumption in the respective track is so-to-say "artificially" increased or decreased by the invention in order thus e.g. to approximate the material consumption of the tracks to one another over a specific period of time or with respect to a specific future point in time. It can hereby be achieved that a consumption state for which a simultaneous filling of all the material stores is sensible results for all the material stores. Only one single operating interruption of the interleaver or underleaver and thus of the cutting process overall is consequently required for filling all the material stores.

The invention utilizes the circumstance that, with respect to the purpose of the interleaved sheets and with respect to the acceptance of the arrangement of slices and interleaved sheets among customers, slight deviations from the normal length—in particular since they are hardly visible or identifiable—are not problematic, on the one hand, and, on the other hand, add up to a relevant increase or decrease of the material consumption in the respective track due to the large number of interleaved sheets that can be achieved by a material store in practice.

It can be sufficient to impact the material consumption in the manner in accordance with the invention in only one of the tracks. Alternatively, provision can be made that an impact on the consumption in accordance with the invention is carried out for each track during operation.

In the apparatus in accordance with the invention for the multitrack provision of web-like interleaved sheet material, at least two material stores, in particular rotatably supported material rolls, are provided, wherein the material stores are each associated with one or more tracks and the individual material webs can be removed from the material stores. Furthermore, the material consumption of at least one material store can be impacted by an internal or external control device during operation, in particular in dependence on the residual quantities in the material stores or on the already consumed quantities, in that the length of the interleaved sheets is variable in the respective track or tracks with respect to the normal length at least for this material store.

Preferred embodiments of the invention are also set forth in the dependent claims, in the description and in the drawing.

In accordance with an embodiment, the length of the interleaved sheets is varied in that the time period is changed during which the respective material web is ejected into the cutting region and/or the speed is changed at which the respective material web is ejected into the cutting region. The ejection time period can be shortened or lengthened with respect to a time period corresponding to the normal length by changing the starting point in time and/or the end point in time for the ejection of the material web which in particular takes place at a constant ejection speed. The ejection duration can consequently simply be predefined by a correspondingly long switch-on time of an output device which effects the ejection of the material web into the cutting region.

In particular if the interleaved sheets are cut off in the cutting region by means of the cutting blade which also cuts off the product slices, a situation results in this procedure in which the change in the length of the interleaved sheets only has an effect at the free end of the material web which is at the front in the ejection direction. No changes with respect to a situation in which all the interleaved sheets have the same normal length therefore result at the rear end of the interleaved sheets. In other words, in this procedure, the interleaved sheets are aligned with one another at their ends which are at the rear in the ejection direction. In a portion comprising slices disposed exactly above one another, all the interleaved sheets consequently project equally far to the rear from the portion. It is hereby ensured that the user not only finds a visually appealing appearance at least at this portion side, but that the purpose of the interleaved sheets is also provided, namely to ensure that the product slices can be easily separated from one another and gripped by the consumer.

In accordance with a further embodiment, the length of the interleaved sheets is varied to the extent that the residual quantities in the material stores are at least approximately the same size, and indeed either at all times or at the latest when an additional condition has been satisfied.

The additional condition can, for example, comprise the fact that the material stores have at least largely been consumed or that a predefined or predefinable value for the residual quantities has been reached or that a specific situation, in particular a foreseeable situation, which relates to the cutting operation is present. It is thus, for example, possible to aim at a state having residual quantities which are at least approximately the same size in the material stores at a time for which the end of a batch of products to be sliced is expected.

Provision can furthermore be made in accordance with the invention that the length of the interleaved sheets is varied such that the residual quantities in the material stores tend toward being the same size.

Provision can furthermore be made in accordance with the invention that the length of the interleaved sheets is varied in time. The deviation of the length of the interleaved sheets from the normal length consequently does not have to be constant in time in a respective track. The invention is consequently not limited to only predefining a constant length deviation for a track for a specific operating period. For each track, the length deviation can rather be a variable which can be changed in time and which is selected at all times such that the respective goal which is aimed at can be achieved safely and reliably.

The possibility of varying the length of the interleaved sheets in time does not preclude that at least some directly consecutive interleaved sheets each have the same length which differs from the normal length. Thus, provision can, for example, be made in accordance with an embodiment of the invention that the length of the interleaved sheets is varied such that the interleaved sheets have the same length within a respective portion comprising a plurality of slices having interleaved sheets. In other words, the length of the interleaved sheets is not, for example, varied slice-wise within a portion here, but a change in the length of the interleaved sheets takes place portion-wise in each case, wherein either a length change is carried out after the completion of each portion or the length remains constant over a plurality of portions.

A length of the interleaved sheets which is constant within a portion ensures a visually appealing appearance of the portion.

It is generally possible in accordance with the invention to either increase or decrease the length of the interleaved sheets with respect to the normal length, i.e. to so-to-say "artificially" increase or reduce the material consumption in the respective track. Provision is, however, made in accordance with a preferred embodiment that the material consumption is only impacted by reducing the normal length. This is in particular the case when the portions are placed in packaging depressions whose maximum extents determine the maximum size of the portions. In this case, an increase in the normal length could have the result that the portions no longer fit into the provided packaging depressions. If, for example, the material consumption is too low in a first track with respect to a second track, the material consumption is not, for instance, increased in the first track in this respect by raising the normal length, but the material consumption is rather decreased in the second track by reducing the normal length.

If no increase in the normal length is provided, it is ensured that the interleaved sheets do not project too far from the respective portion, which would otherwise impair the appearance of the portion and could also make the insertion of the respective portion into a packaging more difficult.

Alternatively, it is possible to impact the material consumption by raising the normal length, and indeed either exclusively or in addition to a reduction of the normal length for at least one of the other material stores.

In accordance with a further embodiment of the invention, provision can be made that the length of the interleaved sheets is reduced such that the front end of at least one interleaved sheet or of some interleaved sheets is disposed between the respective directly adjacent slices. At the corresponding side of a portion comprising a plurality of slices having interleaved sheets, such interleaved sheets do not project from the portion. This does not have to be of disadvantage and can even be advantageous if it is desired to keep the visibility of the interleaved sheets as low as possible. In particular if—as already mentioned above—the interleaved sheets are cut off in the cutting region by means of the cutting blade which also cuts off the respective slice from the product, it is namely already so-to-say automatically ensured at the rear side of the respective portion that the interleaved sheets project from the portion and can satisfy their purpose of enabling an easy separation and gripping of consecutive product slices.

In dependence on the properties of the respective product slices, it may be possible for the consumer to also separate the slices from one another and to grip them without interleaved sheets projecting in the longitudinal direction, i.e. it may be sufficient for the separability of the slices if the interleaved sheets are each completely located between the slices, viewed in the longitudinal direction. An overhang of the interleaved sheets in the longitudinal direction is also not required if the material webs are each wider than the slices and a lateral overhang of the interleaved sheets is thereby present which enables a separation and gripping of the slices for the consumer. The properties of the product slices are not important in this respect.

A calculation of the previous material consumption of at least one material store can, for example, serve as a basis for an impact on the material consumption. This calculation can, for example, be based on data of one or more components, e.g. of the drive or drives, of a removal device by means of which the material web is removed from the respective material store.

Provision can furthermore be made in accordance with the invention that residual quantities in the material stores are determined by means of a measurement device and are communicated to a control device. The control device can be a control device which is integrated into the interleaver or underleaver and which can communicate with a higher-ranking control device which in particular belongs to a slicer. Alternatively, the interleaver or underleaver can be configured to provide the data of the measurement device to a higher-ranking or common control device of the slicer, wherein this control device then coordinates the slicing of the products and the provision of the interleaved sheet material individually per track, including the impact in accordance with the invention on the material consumption in at least one of the tracks.

Provision can alternatively be made that the respective diameter of a material roll forming the material store is measured as a measure for residual quantities in the material stores. Alternatively or additionally, the respective weight of the material store can be determined as a measure for residual quantities in the material stores. A further possibility of determining a measure for residual quantities in the material stores comprises measuring the respective length of the material web which passed through a measurement point arranged downstream of the material store. Furthermore, provision can alternatively or additionally be made that a respective parameter of a removal device which removes the material web from the material store is measured as a measure for residual quantities in the material stores. The parameter can, for example, be the number of revolutions of at least one component of the removal device, ultimately therefore the result of a distance measurement or the power consumption of the removal device. A different kind of distance measurement can also provide the parameter.

In accordance with a further embodiment of the invention, at least some portions which each comprise a plurality of slices having interleaved sheets are checked as to whether the length changes of the interleaved sheets are within predefinable or predefined limits. The results of such checks can, for example, enter into a regulation to ensure that a length change of the interleaved sheets which is too pronounced is omitted.

Provision can be made in the apparatus in accordance with the invention that a multitrack output device which comprises a driven feed roll for each track, which feed roll forms a feed gap for the material web together with a counter-unit, is provided for the ejection of the material webs into the cutting region and is controllable by means of the control device by an operation of the individual feed rolls individually per track.

Such an output device enables an interleaver or underleaver operation on individual tracks and is thus advantageously suitable to impact the material consumption in the individual tracks e.g. in that the time period is changed during which the respective material web is ejected into the cutting region and/or in that the speed is changed at which the respective material web is ejected into the cutting region.

In accordance with a preferred embodiment, the control device is configured to carry out a regulation in which a regulation variable which is directly or indirectly dependent on residual quantities in the material stores is determined as an actual value and the length of the interleaved sheets is changed for one or more material stores on a deviation of the actual value from a predefinable or predefined desired value such that the actual value approximates the desired value.

Provision can be made in this respect that the regulation variable is based on all the differences of a respective two residual quantities and is predefined or predefinable as the desired value such that all the differences within predefinable or predefined tolerances are zero.

A measurement device is preferably provided which is configured to determine residual quantities in the material stores or the respective already consumed material quantities and to communicate them to the control device. Reference is also made to the above statements on the method in accordance with the invention with respect to possible measurement variables for determining residual quantities in the material stores or already consumed material quantities.

A detection device can furthermore be provided which is configured to detect at least some portions which each comprise a plurality of slices having interleaved sheets and thereupon to check whether the length changes of the interleaved sheets are within predefinable or predefined limits. This can, for example, take place by means of a camera.

In general, the apparatus in accordance with the invention can be configured to be operated in accordance with a method in accordance with the invention.

Figure 1A:
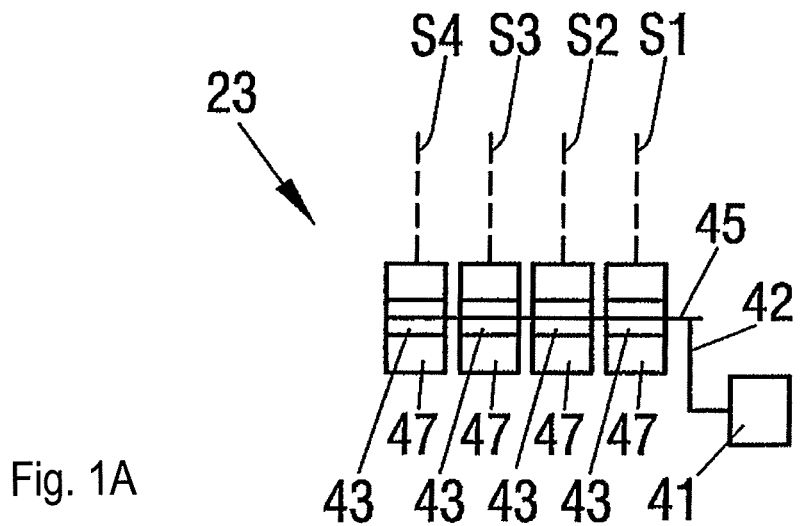
Figure 1B:
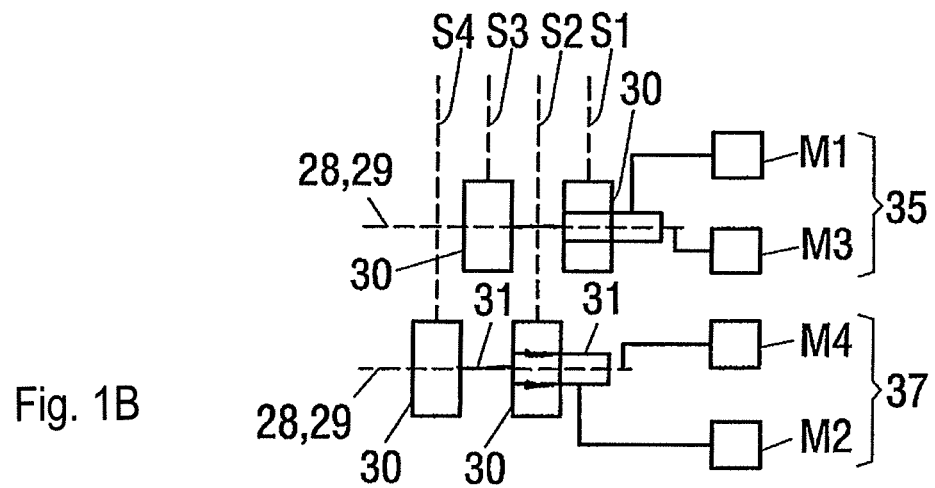
Figure 1C:
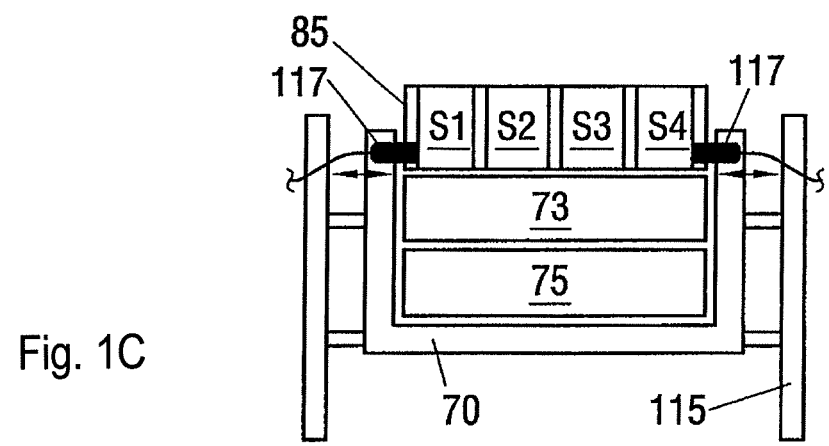
Figures 5A, 5B, 5C:
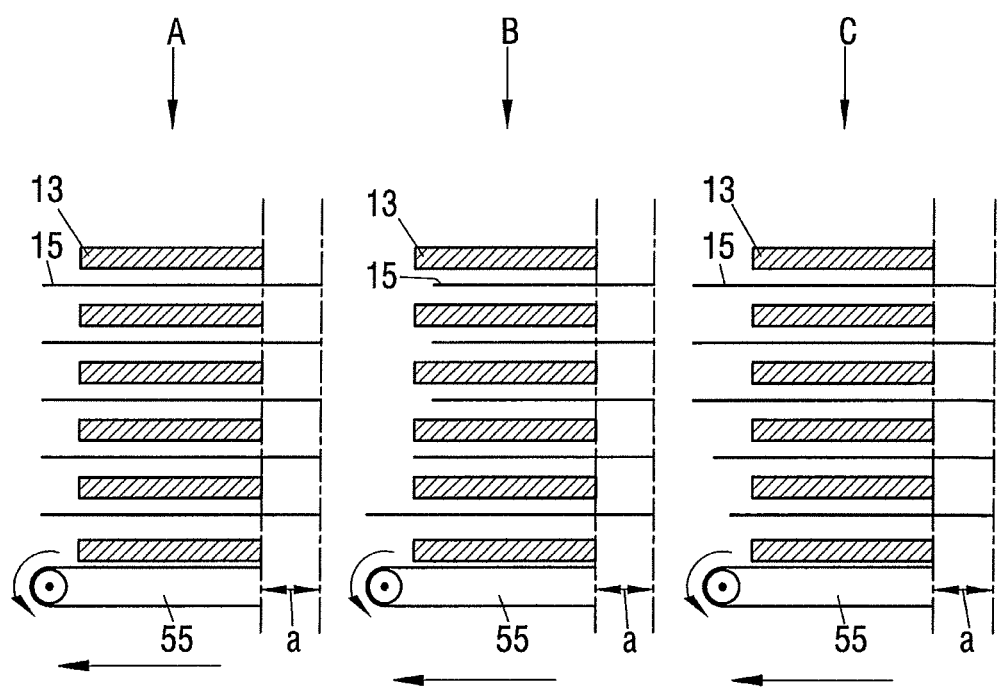
Figures 6A, 6B, 6C:
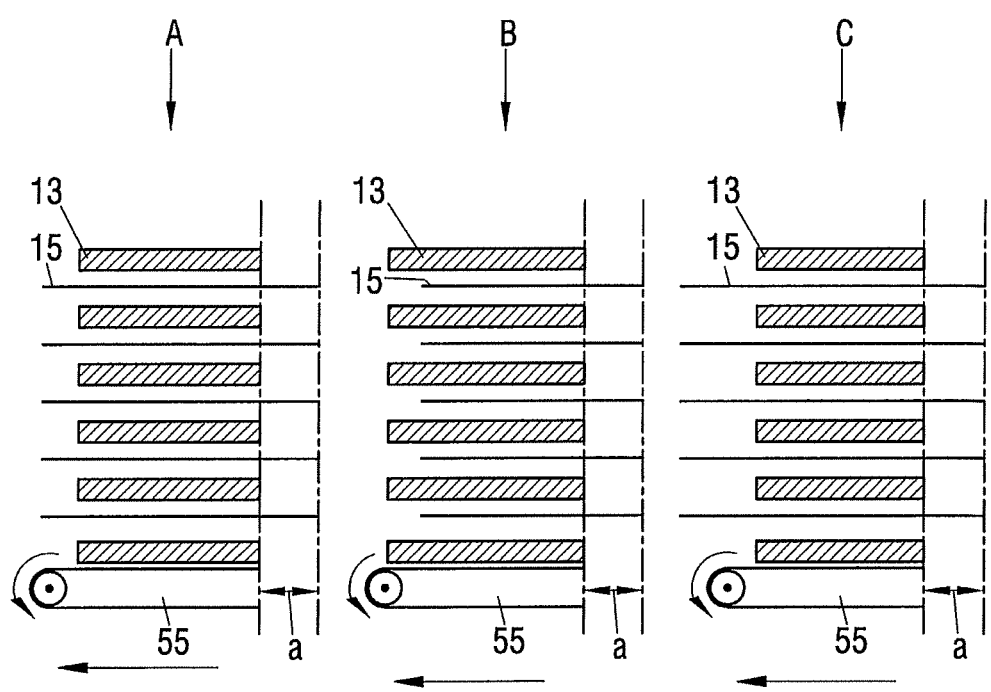

The invention will be described in the following by way of example with reference to the drawing. There are shown:

FIGS. 1-1C FIG. 1 shows, schematically, a side view of a slicer with an interleaver in accordance with an embodiment of the invention and, FIGS. 1A-1C illustrate three individual representations shown schematically;

FIGS. 2-4B schematically in each case, an embodiment of a feed unit of an interleaver;

FIGS. 5A-5C schematically in each case, a plurality of portions each comprising a plurality of cut-off product slices and interleaved sheets for illustrating the effect of the invention; and FIGS. 6A-6C schematically in each case, a plurality of portions each comprising a plurality of cut-off product slices and interleaved sheets for illustrating the effect of the invention.

The large representation in FIG. 1A shows a multitrack high-speed slicer, that is an apparatus for a multitrack slicing of food products such as sausage, meat or cheese, in a schematic side view which is not to scale.

In the embodiment shown, the slicer is operated on four tracks. Four products 11 to be sliced are disposed next to one another on a product support 53 inclined to the horizontal. A product feed 49 comprises for each track, that is for each of the four products 11, a product holder 46, also called a product gripper, which holds the product 11 at the rear end and supplies it in the supply direction indicated by the arrow to a cutting plane 50 which extends perpendicular to the product support 53 and in which a cutting blade 51 moves by whose cutting edge the cutting plane 50 is defined.

The cutting blade 51 can be a so-called scythe-like blade or spiral blade which has a cutting edge extending in a scythe-like form or spiral form and which only rotates about a blade axis, not shown. Alternatively, the cutting blade 51 can be a so-called circular blade which has a circular cutting edge, which rotates about its own blade axis and which additionally revolves in a planetary motion about an axis extending offset in parallel from the blade axis in order to produce the cutting movement relative to the products 11 required to cut off slices 13 from the products 11.

The product feed 49 can be operated individually per track, i.e. the product holders 46 can generally move independently of one another in the supply direction and thus supply the individual products 11 to the cutting plane 50 at different speeds and with different speed profiles. This also applies if product support belts which are drivable individually per track are used instead of a passive product support 53 as the product feed 49 instead of the product holders 46 or in addition to the product holders 46. The slicing process can hereby be individually controlled in each track independently of the respective other tracks, in particular with the aim of an exact weight production of slices 13 or portions formed from a respective plurality of slices 13 while taking into account the individual product properties such as in particular weight distribution and cross-sectional profile.

It is also possible to stop the product holder 46 in a track or to move it against the supply direction in order temporarily not to cut off any slices 13 from the respective product 11 while the products 11 continue to be sliced in the other tracks. The product feed 49 on individual tracks can also take into account the cutting movement of the cutting blade 51 which is characterized in that a respective slice 13 is indeed cut off from all the products 11 per cutting movement—that is per revolution or rotation of the cutting blade 51—but this does not take place at the exact same time, the cut-off slices 13 of the products 11 rather falling onto the support surface, formed by a so-called portioning belt 55 here, consecutively in time due to the passage of the cutting blade 51 through the products 11 which requires a specific duration of time.

For many products 11, for example ham or some types of cheese, it is desired for the respective slices 13 which are disposed above one another and, for example, form a stack-like portion or an overlapping portion to be separate from one another so that they can later be individually removed more easily by a consumer from a package including the portion. In the field of high-speed slicers, this purpose is served by so-called interleavers, that is apparatus for the provision of web-like interleaved sheet material, by means of which it is possible to introduce interleaved sheets 15 between directly consecutive slices 13.

There are interleavers in different designs. In accordance with a widespread mode of operation, which is also provided for the interleaver in accordance with the invention shown here, the endless material webs 19 are ejected in the region of the cutting plane 50 coming from below in accordance with the clocking predefined by the cutting movement of the cutting blade 51. This takes place such that the front end of the respective material web 19 is disposed in front of the cut surface of the respective product 11 and, together with the slice 13 which is cut off next, is cut off from the material web 19 by means of the cutting blade 51 and thus forms an interleaved sheet 15. This interleaved sheet comes to lie on the portioning belt 55 or on the previously cut-off slice 13 and beneath that slice 13 with which the interleaved sheet 15 was previously cut off together.

The design and the mode of operation of such slicers and also the basic principle of an interleaver are sufficiently known to the skilled person so that it is not necessary to look at them in any more detail in the following.

The interleaver in accordance with the invention which is integrated into the slicer is of multitrack design and is configured to continuously provide the interleaved sheet material on individual tracks. The design and the mode of operation of the interleaver will be explained in the following using the example of a four-track operation. The interleaver in accordance with the invention can, however, also be operated on one track, on two tracks or on three tracks by a comparatively simple conversion. The respective operating mode is, for example, dependent on the products to be sliced, on the conveying and sorting devices connected downstream and on the type of packaging or on the packaging machine. The interleaver in accordance with the invention is generally designed such that an operation with any desired number of tracks and consequently also with more than four tracks is possible.

For each of the four tracks S1, S2, S3 and S4, the provision of the interleaved sheet material comprises the removal of the material from a material store formed by a material roll 17, the storage of material in a loop store 61, the guidance of the material in a region between the loop store 61 and an output device 71, and the outputting of the material by means of the output device 71.

For each track, the removal of the material web 19 from the material roll 17 comprises the rolling off of the material web 19 by means of a roll-off drive 21 and the conveying of the material web 19 into the loop store 61 by means of a conveying device 23 common to all the tracks. The individual roll-off drives 21 and the common conveying device 23 form a removal device of the interleaver in accordance with the invention.

For each track, the storage of the material web 19 takes place by the formation of a material loop 20 in the loop store 61. The individual material webs 19 or loops 20 are laterally guided by dividing walls (not shown) in the loop store 61 to ensure the accuracy of the material webs 19 on the tracks.

In the embodiment shown, the total transport path for the material web 19 between the loop store 61 and the output device 71 is formed by a shaft 111 in which the individual material webs 19 are guided. Such a design is indeed possible in practice. However, further devices which will not be looked at in any more detail at this point are preferably provided between the loop store 61 and the output device 71 in addition to a purely guidance section such as is formed by the shaft 111 in FIG. 1.

The outputting of the individual material webs 19 respectively comprises the removal of the material web 19 from the loop store 61 and the ejection of the material web 19 into the cutting region, that is before the cut surface of the respective product 11, as explained above. The material web 19 is pulled from the loop store 61 on the removal. The material web 19 is in this respect simultaneously advanced into the cutting region and is thus ejected.

These individual regions of the interleaver in accordance with the invention, that is the removal device comprising the individual roll-off drives 21 and the common conveying device 23, the loop store 61 and the output device 71, will be described in more detail in the following. If not otherwise stated, the respective description of the function and design applies to each of the individual tracks.

The interplay of these individual functional units of the interleaver with one another and also the interplay of the interleaver with the functional units of the slicer, in particular—but not exclusively—with the cutting blade 51 and with the product feed 49, is controlled by a control device 39 which can be the central control device of the slicer and thus a control device which is external with respect to the interleaver. Alternatively, the interleaver can have an internal control device which cooperates with a control device of the slicer.

Furthermore, the interleaver can additionally receive external signals e.g. from a camera system which monitors the portions produced by means of the slicer or the portion formation from the cut-off slices.

The material rolls 17 of the individual tracks are rotatably supported about a common axis of rotation 33 defined by a common mandrel. Each material roll 17 comprises a roll core 113 at which the material web 19 is wound. The material rolls 17 are freely rotatable at the mandrel to the extent that the rotational drive for the material rolls 17 for the rolling off of the material webs 19 does not takes place via this common mandrel.

Instead, a separate roll-off drive 21 is provided for each material roll 17. Each roll-off drive 21 comprises a drive arm 27 pivotable about a pivot axis 28. Each drive arm 27 comprises a support, not shown, to whose one end a drive roller 30 is attached and to whose other end a deflection roller 32 is attached. An endless belt 25 revolving around the drive roller 30 and the deflection roller 32 serves as a drive member for the material roll 17; it is configured as a friction belt and serves to cooperate in a force-transmitting manner with the wound material web 19 of the material roll 17 via the turn facing the material roll 17.

As is also shown in the schematic representation in FIG. 1B, each drive roller 30 is rotationally fixedly connected to a drive shaft 31 which can be set into rotation by means of a drive motor M via a drive belt 24 in order to drive the friction belt 25 and to roll the material web 19 off from the material roll 17 in this manner.

Since the four tracks 51, S2, S3 and S4 of the interleaver extend in parallel and four material rolls 17 are thus also seated next to one another on the common mandrel, the four drive arms 27 are accordingly arranged offset from one another in the transverse direction. This is indicated in the schematic representation in FIG. 1B by the association of the tracks 51 to S4 with the individual drive rollers 30 of the drive arms 27.

The spatial arrangement of the drive arms 27 and the manner of the rotational drive for the drive rollers 30 are particularly advantageous. The axes of rotation 29 of the drive shafts 31 and thus of the drive rollers 30 each coincide with the pivot axis 28 of the respective drive arm 27. In this respect, a single common pivot axis 28 is not provided for all the drive arms 27. Instead, the drive arms 27 are combined pair-wise, wherein a common pivot axis is provided for each pair. Two drive arms 27 pivotable about an upper pivot axis 28 are in this respect associated with the tracks 51 and S3, whereas two drive arms 27 which are pivotable about an lower pivot axis 28 are associated with the tracks S2 and S4.

In the embodiment shown, all the drive arms 27 have the same length and the upper pivot axis 28 and the lower pivot axis 28 are disposed at a circular cylinder about the common axis of rotation 33 of the material rolls 17. Alternatively, the drive arms 27 can be of different lengths and the pivot axes 28 can be arranged in a different manner.

A respective coaxial shaft drive 35 or 37 is provided for both the upper pair of drive arms 27 and the lower pair of drive arms 27. The two drive motors M1 and M3 belong to the upper coaxial shaft drive 35, whereas the lower coaxial shaft drive 37 comprises the two drive motors M4 and M2. A motor M3 or M4 respectively is connected to an inner drive shaft 31 for the drive roller 30 which is disposed further away axially, whereas the respective other motor M1 or M2 is connected to a hollow shaft 31 which surrounds the inner drive shaft 31 and on which the more closely disposed drive roller 30 is seated.

As already mentioned, the drive motors M1 to M4 are not directly connected to the drive shafts 31, but rather via drive belts 24. This enables a displaced or an offset positioning of the motors and consequently an ideal use of the space available in the interleaver. Furthermore, the interleaver can hereby be designed comparatively narrow since the motors M1 to M4 respectively do not need to be positioned in the axial extension of the drive shafts 31.

A further advantage of this drive concept comprises all of the motors M1 to M4, including the drive belts 24, only being arranged at one side of the interleaver. This region is therefore more easily accessible via the other side of the interleaver. It is particularly advantageous that all the drive rollers 30, and thus the drive arms 27, can be plugged onto the respective drive shaft 31 and can be removed from it from the same side—namely starting from the "preferred" operating side. This not only facilitates cleaning and servicing, but also enables a simple and fast conversion, for example, when a slicer and interleaver operation should be converted to a different number of tracks.

These advantages also apply to the arrangement of the material rolls 17 which can all be plugged onto the common mandrel and can be removed from it from the same side— and indeed from the same side as the roll-off drives 21. It is therefore sufficient if the functional regions of the interleaver are only accessible from one side.

A pivot drive, not shown, is additionally provided for each drive arm 27. The pivot drive can, for example, comprise a piston-in-cylinder arrangement. The drive arms 27 can hereby each be pivoted into a passive state in which the friction belt 25 is out of frictional engagement with the material roll 71. This passive state can, for example, be a parked position into which the drive arms 27 are pivoted when new material rolls 17 are to be inserted.

The fact that in accordance with the invention the respective friction belt 25 of the roll-off drives 21 engages in a force-transmitting manner at the outer periphery of the material roll 17 to roll off the material web 19 has the advantage that the roll-off rate, i.e. the web length rolled off per time unit, is independent of the current diameter of the material roll 17 and thus of its degree of consumption. The above-mentioned pivot drives (not shown) can each pretension the drive arm 27 in the direction of the axis of rotation 33 of the material roll 17 with a predefined force or with a predefined torque such that the drive arm 27 is adjusted to track the diameter of the material roll 17, which decreases during operation, and the frictional engagement between the friction belt 25 and the wound material web 19 is always of the same magnitude.

A material roll 17 which is almost consumed and whose diameter is only a little larger than the diameter of the roll core 113 is shown by a dashed circle. An upper drive arm 27 and a lower drive arm 27 are shown by a dashed line to illustrate a state pivoted correspondingly far in the direction of the axis of rotation 33 of the material rolls 17.

The operation of the roll-off drives 21 depends on demands of the central control device 39. If less material or temporarily no material is required in a track, the roll-off rate of the respective track can be correspondingly changed by reducing the revolution speed of the friction belt 25 or by switching off the drive motor M. In a non-driving state with the drive motor M switched off, the frictional belt 25 of the respective drive arm 27 remains in frictional engagement with the wound material web 19; it is therefore not, for instance, pivoted out of engagement with the material roll 17 by means of the above-mentioned pivot drive (not shown). This has the advantage that the frictional belt 25 is active as a brake for the material roll 17, whereby a further rotation of the material roll 17 caused by inertia is prevented.

The removal of the material webs 19 from the material rolls 17 not only comprises the rolling off by means of the above-explained roll-off drives 21, but also the conveying of the material webs 19 into the loop store 61. For this purpose, the removal device comprises a conveying device 23 which is additionally shown schematically in FIG. 1A.

The conveying device 23 comprises a conveying roller 47 for each track S1 to S4, said conveying roller forming a conveying gap for the respective material web 19 together with a counter-roller 48. All of the conveying rollers 47 are seated on a common drive shaft 45, that is they are only driven together, and indeed via a common drive motor 41 which sets the common drive shaft 45 of the conveying rollers 47 into rotation via a drive belt 42.

The operation of this conveying device 23 individually per track is achieved in that a slip clutch 43 which is arranged between the conveying roller 47 and the common drive shaft 31 is associated with each conveying roller 47. The slip clutches 43 are each magnetic clutches whose switching points can be set.

The conveying device 23 is operated via the control device 39 such that the material webs 19 are each always held under tension between the respective material roll 17 and the respective conveying roller 47. During operation, the common drive shaft 45 can rotate at a constant rotational speed which is coordinated with an expected operation of the interleaver for the respective cutting program of the slicer. If the roll-off drive 21 is stopped in a track or if the roll-off rate is reduced in a track, an active intervention in the operation of the conveying device 23 is not required since a roll-off rate in a track that falls below the conveying rate of the conveying device 23 is taken up by the clutch 43 of this track without the respective material web 19 being excessively strained or even tearing.

An advantage of this concept comprises the conveying device 23 only requiring a single drive comprising a drive motor 41 and a drive belt 42 and only requiring a single common drive shaft 45 for all the tracks S1 to S4 and no design or technical control measures being necessary to implement an active operation of the conveying device 23 individually per track.

If the clutch 43 is not currently active in one of the tracks and temporarily no material is thus conveyed into the loop store 61 in this track, the conveying rate of the conveying device 23 determines the web length entering the loop store 61 per time unit in each track. Since the operation of the individual roll-off drives 21 which is controlled via the control device 39 ultimately decides whether and how much material is rolled off from the respective material roll 17 per time unit in the individual tracks, the individual conveying rates into the loop store 61 are ultimately determined by the individual roll-off rates.

The track-specific material requirement in the cutting region is determined by the control device 39 and is ensured by a corresponding track-specific control of the roll-off drives 21. The loop store 61 ensures a decoupling in each track between the sluggish material roll 17, on the one hand, and the highly dynamic output device 71, on the other hand, which, in the cycle of the cutting blade 51, has to output a web length corresponding to the length of the respective required interleaved sheet 15, in each case on short notice. Such a highly dynamic cyclic ejection of relatively long material sections would be incompatible with a pulling off of the material web 19 directly from the material roll 17.

The control device 39 therefore ensures that a web length which is sufficiently large for a disruption-free output operation of the output device 71 is available in the loop store 61 in each track at all times in that a material loop 20 which is always sufficiently large is provided in the loop store 61.

The formation and maintenance of these material loops 20 in the individual tracks is achieved by a sufficiently large "replenishment" by means of the removal device, that is by means of the roll-off drives 21 and the conveying device 23, on the one hand, and by an air circuit comprising a combined suction and blowing device 63, 65, on the other hand.

The suction side of a fan 64 belonging to this combined suction and blowing device 63, 65 is connected via a suction line 66 to a vacuum housing 68 in which a plurality of vacuum chambers 69 are formed which are separate from one another in a technical flow aspect within the housing 68. The pressure in each vacuum chamber 69 can be measured by means of sensors, not shown, and can be provided to the control device 39.

The housing 68 is bounded toward a loop region of the loop store 61 by a curved contact surface 67 in which openings are formed via which air can move from the loop region into the individual vacuum chambers 69, such as is indicated by the small arrows. The vacuum chambers 69 are each connected to the suction line 66 and thus to the suction side of the fan 64 whose pressure side is directed into the loop region, such as is indicated by the arrow in FIG. 1.

This air circuit has the effect that a designated material loop 20 is always formed and that the material web 19 contacts the contact surface 67 of the vacuum housing 68 in the designated manner. Since the material web 19 is sucked toward the contact surface 67 due to the vacuum present in the vacuum chambers 69, the contact surface 67 simultaneously serves as a brake for the material webs 19. The material webs 19 are hereby always held under a light tension, whereby the material webs 19 are prevented from compressing when the output device 71 which works in the cutting cycle pulls the material webs 19 out of the loop store 61 in a highly dynamic manner. The braking effect of the contact surface 67 or of the vacuum chambers 69 is in this respect set such that this highly dynamic removal process is not impaired.

The control device 39 can recognize by means of the mentioned pressure sensors in the vacuum chambers 69 which vacuum chamber 69 is covered by the material web 19 and which is not. A measure for the current size of the material loop 20 in the loop region of the loop store 61 can be derived from this information in a simple manner with sufficient accuracy. The material web 19 drawn as a dashed line is shown with a maximum loop size in FIG. 1. The extent of the material web 19 with a minimal loop size, in which only the uppermost vacuum chamber 69 is partly covered by the material web 19, is indicated by a dotted line.

The control 39 can activate or deactivate the individual roll-off drives 21 individually per track in accordance with the individual loop sizes determined in this manner or it can change the individual roll-off rates by a corresponding control of the motors M1 to M4 to ensure that a sufficiently large material loop 20 is present for each track at all times to maintain the above-explained decoupling between the respective track of the output device 71 and the associated material roll 17.

The output device 71 is likewise configured for an operation individually per track. For this purpose, a feed unit 73 comprises a feed roll 74 for each of the tracks S1 to S4, as will be explained in more detail in the following with reference to two possible embodiments in accordance with FIGS. 2 and 3. The feed rolls 74 have a common axis of rotation 99, wherein a separate drive motor A1, A2, A3 or A4 is provided for each feed roll 74 and cooperates via a drive belt 78 with a drive shaft 83 (cf. FIG. 2) to which the respective feed roll 74 is rotationally fixedly connected.

As FIG. 2 shows, the two feed rolls 74 for the tracks S1 and S2 are driven via a right coaxial shaft drive 79, whereas a left coaxial shaft drive 81 drives the two feed rolls 74 of the other two tracks S3 and S4. The respective inwardly disposed feed roll 74 is driven via an inwardly disposed drive shaft 83, whereas the respective outwardly disposed feed roll 74 is driven via a hollow shaft 83 surrounding the inwardly disposed drive shaft 83.

In this manner, a drive individually per track of four feed rolls 74 arranged next to one another at a common axis of rotation 99 can be implemented for the feed unit 73 of the output device 71.

Figure 3:
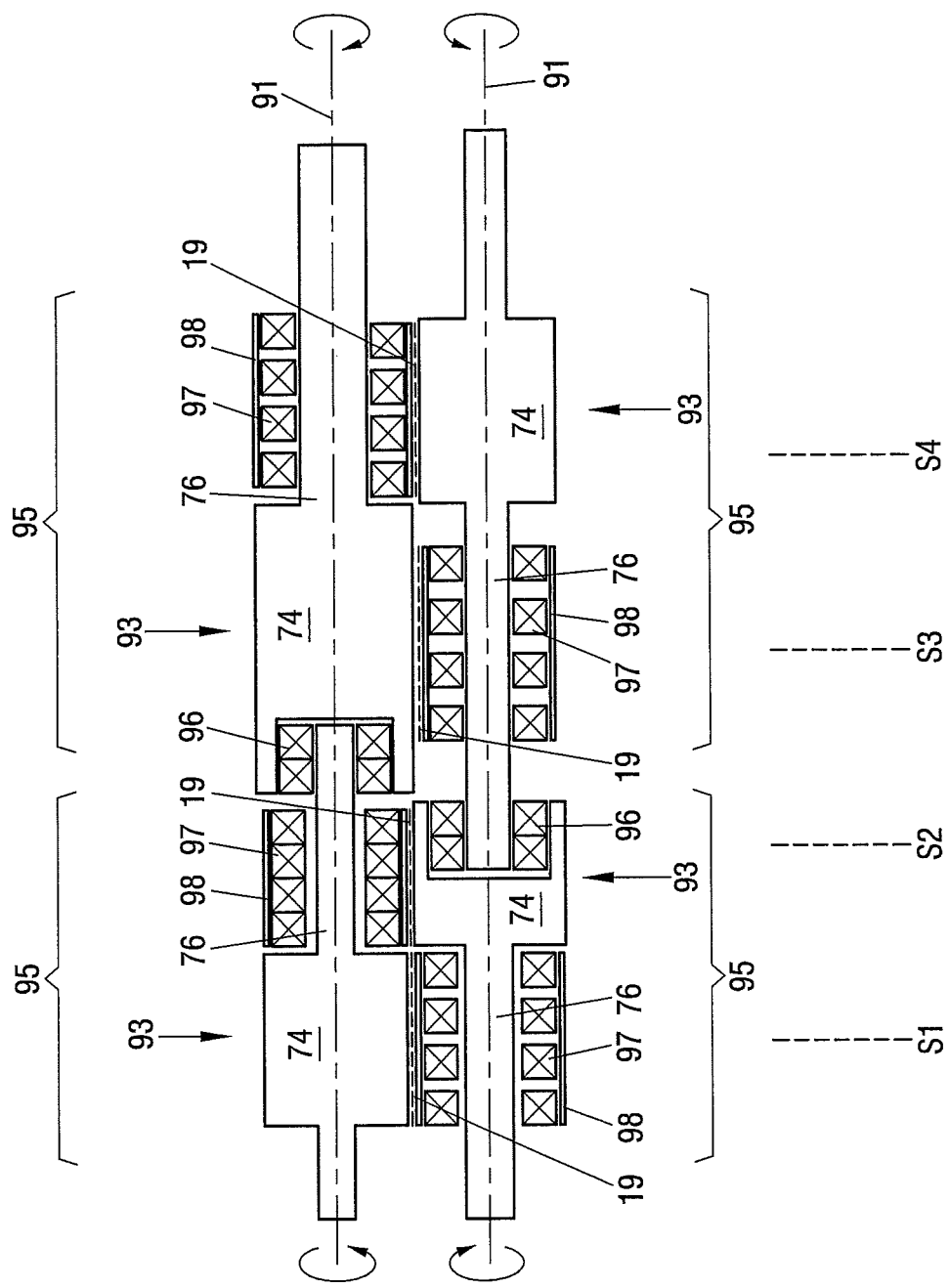

An alternative design for a four-track drive comprising four individually drivable feed rolls 74 is schematically shown in FIG. 3. Two axes of rotation 91 which extend in parallel are provided here, wherein a respective two two-track units 95 are arranged next to one another at each of the two axes 91. Each two-track unit 95 comprises a feed roll 74 and a pressing roller 76 which are rotationally fixedly connected to one another and which can, for example, be formed in one piece with one another. Each feed roll 74 cooperates directly with a respective material web 19, whereas the co-rotating pressing roller 76 is provided with a freewheeling function with respect to the material web 19 in its track. The freewheeling function is implemented in that the pressing roller 76 supports a freely rotatable pressing sleeve 98 for the material web 19 via a rolling element bearing 97.

A feed roll 74 at the one axis 91 and a pressing unit comprising the pressing roller 76 and the pressing sleeve 98 at the other axis 91 therefore form a pair 98 for each of the tracks S1 to S4, said pair forming a feed gap for the respective material web 19.

Each two-track unit 95 can, for example, be rotated about the respective axis 91 via a drive belt, not shown, by means of an associated drive motor (not shown), wherein the two axes 91 are driven with an opposite rotational sense. Adjacent two-track units 95 at a common axis 91 are rotatable relative to one another. For this purpose, a respective axial extension of a pressing roller 76 engages into an end-face depression of the adjacent feed roll 74 at which the extension of the pressing roller 76 is supported in the radial direction by a rolling element bearing 96.

Due to this arrangement, a feed individually per track for four tracks S1 to S4 disposed next to one another is implemented as a particularly compact unit into which the counter-units or pressing units 76, 98 associated with the individual feed rolls 74 are integrated. A division into a feed unit, on the one hand, and into a counter-unit, on the other hand, as in the embodiment in accordance with FIGS. 1 and 2, is consequently not provided here.

As FIGS. 1 and 10 show, in the embodiment shown here, a counter-unit 75 is provided in addition to the feed unit 73 comprising the four feed rolls 74 which can be driven individually per track. The counter-unit 75 can have at least one associated pressing roller 76 for each feed roll 74, which pressing roller is supported in an elastic or a resilient manner such as is indicated schematically in FIG. 1 by the suspension 77 and is indicated schematically in FIG. 4A by a piston-in-cylinder arrangement 109 configured as a suspension.

Alternatively, the counter-unit 75 can have a plurality of counter-elements arranged distributed along an axis extending in parallel with the axis of rotation 99 of the feed rolls 74, in particular counter-elements in the form of individually resiliently supported pressing rolls or pressing rollers each having a diameter which is small with respect to the feed rolls 74. These counter-elements which are not driven form a feed gap for one of the material webs 19 with each of the feed rolls 74. Such counter-units or pressing units for output devices of interleavers are generally known so that it is not necessary to look at them in more detail.

As the representation in FIG. 10 shows schematically, it is a special feature of the output device 71 that the feed unit 73 and the counter-unit 75 are attached to a stationary mount 70, fastened to a machine frame 115 of the slicer, together with a cutting edge 85 which is also called cutting glasses, a molded tray or a counter-blade.

The mount 70 and the components counter-unit 75, feed unit 73 and cutting edge 85 are configured corresponding to one another such that these components can only be mounted at the mount 70, without tools, in a single order.

In this respect, the counter-unit 75 is first arranged at the mount 70. The counter-unit 75 is fixed and secured in its desired position by a subsequent attachment of the feed unit 73. The attachment of the feed unit 73 requires a combined turn-pivot movement into an end position which—as indicated by the arrow in the large representation of FIG. 1—has the consequence that, on the attachment of the feed unit 73, all the drive belts 78 of the drive motors A1 to A4 are simultaneously tensioned which were previously, in the relaxed state, placed around the drive shafts 83 of the feed rolls 74 projecting at both sides. Accordingly, the drive belts 78 are automatically relaxed on the removal of the feed unit 73.

Finally, the cutting edge 85 is attached to the mount 70. The cutting edge 85 in turn positions and secures the feed unit 73 in its desired position. A clamping device 117 comprising two clamping pins 117 which are pneumatically adjustable relative to the mount 70—as indicated by the two double arrows—positions and subsequently secures the cutting edge 85 and thus all three components counter-unit 75, feed unit 73 and cutting edge 85 at the mount 70.

The mount 70 can furthermore serve for the attachment of further devices. Thus it may e.g. be necessary in practice to set the so-called cutting gap between the cutting blade 51 and the cutting edge 85 to a specific value. In this connection, sensors such as vibration sensors can be used which can be attached to the mount 70 or integrated into the mount 70.

A simple and reliable assembly and dismantling of the three named components without tools is implemented in this manner.

A query can additionally take place by the control device 39 by means of the clamping pins 117 and it can be recognized whether a cutting edge 85 is present at all and whether—in dependence on the respective set cutting program—the correct cutting edge 85 has been mounted. When a cutting edge 85 is missing, the clamping pins 117, for example, extend further than when the correct cutting edge 85 is present—this incorrect positioning of the clamping pins 117 can be recognized by the control device 39.

As already explained above, the ejection of the material web 19 by means of the output device 71 takes place such that the front end of the material web 19 is disposed in front of the cut surface of the respective product 11 so that it can be cut off from the material web 19 by means of the cutting blade 51 together with the slice 13 to be cut off next and can thus form an interleaved sheet 15.

To influence the front end of the material web 19 in this sense, a vacuum is generated by means of an air flow in the region between the material web 19 and the cut surface of the product 11 and has the effect that the front end of the material web 19 is placed against the cut surface. This concept is generally known. The air flow can e.g. be generated in that compressed air is ejected via a gap extending transversely to the material web 19 or via a plurality of openings arranged distributed in the transverse direction.

As FIGS. 4A and 4B show, in accordance with the invention, an individually variable air flow 87 is generated for each of the tracks S1 to S4 via the feed unit 73 such that the free ends of the individual material webs 19 can be influenced individually per track. The individual air flows 87 can be varied individually per track in a time regard and with respect to their strength.

This is achieved in that, for each track S1 to S4, a plurality of outlet openings are arranged distributed transversely to the respective material web 19 in the front region of the feed unit 73 above the outlet gap for the individual material webs 19 which is formed by the feed unit 73 and by the counter-unit 75.

Each outlet opening belongs to an outlet passage 101 formed in the feed unit 73, with all the outlet passages 101 starting from a common distributor space 103 which is in communication with a compressed air source, not shown, via an inlet passage 105 and via a supply line 107. Each supply line 107 is provided with a controllable valve 108. The valves 108 can be controlled individually per track via an adjustment device 89.

The time behavior and the strength of the respective air flow 87 can hereby be varied for each of the tracks S1 to S4 independently of the respective other tracks.

The rail 72 also shown in FIG. 4A is a replaceable wear part which preferably comprises plastic and which serves as a cutting edge which cooperates with the cutting blade 51 on the cutting through of the individual material webs 19.

The interleaver can be configured to automatically connect consecutive material webs 19 to one another in each of the individual tracks S1 to S4. In FIG. 1, possible positions are schematically shown at which a connection device V integrated into the interleaver can be arranged.

A change device which is configured to automatically replace a respective used material roll 17 with a material roll 17 to be used is not shown in FIG. 1. The change device can be arranged outside the interleaver or can at least partly be integrated into the interleaver. A separate change device can be provided for each of the tracks S1 to S4. Alternatively, a plurality of tracks or all the tracks can have a common change device.

A multitrack design of the interleaver can also be implemented in that a common rotatably supported material roll 17 is provided for a plurality of tracks S, with a device T for dividing the material web 19 into a plurality of individual material webs 19 being provided for the material web 19 of this common material roll 17. A possible position at which such a division device T integrated into the interleaver can be arranged is schematically indicated in FIG. 1. Only one roll-off drive 21 is then provided for these tracks S, i.e. for the respective material roll 17.

In this respect, it is e.g. possible that a four-track interleaver is implemented in that two material rolls 17 are provided with which a roll-off drive 21 and a division device T are respectively associated, i.e. from whose material web 19 a respective two individual material webs 19 arise such that four individual material webs 19 move to the devices arranged downstream of the division devices T, such as in the case that a separate material roll 17, and no division device T, is provided for each track S.

Different combinations are conceivable. For example, in a four-track interleaver, a respective separate material roll can e.g. be provided for two tracks and a common material roll and a division device can be provided for two further tracks.

A handling of the individual material webs 19 individually per track in a continuous manner is consequently possible in the interleaver in accordance with the invention such that the interleaver can be operated by means of the control device 39 in dependence on the cutting process in such a manner that the interleaver operation on individual tracks can be perfectly coordinated with the cutting operation on individual tracks.

It must also be mentioned for reasons of completeness that an interleaver configured on one track or temporarily operated on one track can have a roll-off drive, such as is respectively described above for one of the tracks S1 to S4.

In FIGS. 5A-5C and 6A-6C, a portion is schematically shown in the respective representations A, B and C and comprises a plurality of slices 13 which are arranged above one another and between which interleaved sheets 15 are located. The portions are each still disposed on the portioning belt 55 onto which the cut-off slices 13 fall after one another during the slicing and by means of which the portions are each moved out of the cutting region in the transporting-away direction indicated by the arrow after their completion.

The representations A each show the prior art in which all the interleaved sheets 15 have the same normal length. The size of the normal length is fixed by the operator of the slicer in dependence on the respective application, in particular in dependence on the extent of the product slices in the ejection direction of the interleaved sheet material, prior to the start of the slicing operation and is not changed during the cutting operation.

Such portions can be produced by means of a high-speed slicer having an interleaver such as has, for example, been described above in connection with FIGS. 1 to 4B. This slicer is furthermore configured to change the length of the interleaved sheets 15 with respect to the normal length during operation in the manner in accordance with the invention. FIGS. 5A-5C and FIGS. 6A-6C show different possibilities of how such a length change can take place in the respective representations B and C.

In accordance with the representation B in FIG. 5B, the length of the interleaved sheets 15 is reduced within the portion starting from the normal length, wherein the reduced length is the same for the three last introduced interleaved sheets 15 of the portion. In this respect, the normal length was reduced such that the ends of the interleaved sheets 15 which are at the front in the ejection direction are each disposed between the respective slices 13 and thus do not project to the front from the portion.

In the representation C in FIG. 5C, the reverse case is shown in which the length of the interleaved sheets 15 is increased within the portion starting from the normal length. All the interleaved sheets 15 consequently project to the front from the portion here.

As the comparison of the three representations A, B and C shows, the rear overhang a of the interleaved sheets 15 is always the same size and is not affected by the change in accordance with the invention in the length of the interleaved sheets 15 in accordance with the representations B and C. As already initially mentioned, such a situation automatically results when the interleaved sheets 15 are cut off from the provided interleaved sheet material in the cutting region by means of the cutting blade which also cuts off the respective slices 13 from the products.

This also applies to the variants shown in the representations B and C of FIGS. 6B and 6C. The representation A in FIG. 6A is identical to the representation A in FIG. 5A. Provision is in particular made in this respect that the respective outlet of the interleaved sheet material is located slightly below the support plane in the cutting region, said support plane being defined by a support surface for the slices 13. The support surface can e.g. be provided by a portioning belt 55 such as shown by FIGS. 5A to 5C and FIGS. 6A to 6C and also FIG. 1.

Unlike in FIGS. 5B and 5C, the reduced (representation B) or the enlarged (representation C) length of the interleaved sheets is constant within the respective portion in the variants in accordance with the representations B and C in FIGS. 6B and 6C. A constant interleaved sheet length within a portion can represent the preferred design for many applications due to the particularly uniform appearance.

Against this background, a constant interleaved sheet length is not important when the interleaved sheet length is anyway reduced with respect to the normal length such that even an interleaved sheet 15 having a length which is a maximum length within the framework of the impact on the consumption does not project to the front from the portion.

The advantage of the invention generally comprises the material consumption being able to be impacted such that the material stores are consumed uniformly or such that it can at least be achieved that at least approximately the same residual quantity is respectively present in all the material stores at a specific time.

In this respect, it is not compulsory for the material stores to only have the same residual quantity state when the material stores have more or less been completely consumed and the residual quantities are thus each approximately zero. A residual quantity of the same size in all the material stores is also of advantage when the residual quantity differs from zero, that is a material web having a relevant length is respectively still present in the material stores. Material stores having such residual quantities can, for example, be removed together and can be stored for a later application in which a comparatively small batch of products should be sliced and consequently relatively little material is required.

Overall, work interruptions and time losses due to isolated store filling processes, such as material roll replacement processes, can be minimized by the invention. In particular with respect to the total slicing line, its operation can hereby be planned better in advance. The product throughput of the slicing line can in this respect be increased without losses at another position.

REFERENCE NUMERAL LIST 11 product
13 slice
15 interleaved sheet
17 material roll
19 material web
20 loop
21 roll-off drive
23 conveying device
24 drive belt
25 friction belt, drive member
27 drive arm
28 pivot axis
29 axis of rotation of the drive shafts
30 drive roller
31 drive shaft
32 deflection roller
33 axis of rotation of the material rolls
35 upper coaxial shaft drive
37 lower coaxial shaft drive
39 control device
41 drive of the conveying device
42 drive belt
43 clutch
45 drive shaft
46 product holder
47 conveying roller
48 counter-roller
49 product feed
50 cutting plane
51 cutting blade
53 product support
55 portioning belt
61 loop store
63 suction device, brake
64 fan
65 blowing device
66 suction line
67 contact surface
68 housing 69 vacuum chamber
70 mount
71 output device
72 rail
73 feed unit
74 feed roll
75 counter-unit
76 pressing roller
77 suspension
78 drive belt
79 right coaxial shaft drive
81 left coaxial shaft drive
83 drive shaft
85 cutting edge
87 compressed air flow
89 adjustment device
91 common axis
93 pair
95 two-track unit
96 rolling element bearing
97 rolling element bearing
98 pressing sleeve
99 common axis of rotation
101 outlet passage
103 distributor space
105 inlet passage
107 supply line
108 valve
109 piston-in-cylinder arrangement
111 shaft
113 roll core
115 machine frame
117 clamping pin
S track
M drive motor of the roll-off drive
A drive motor for the feed roll
V connection device
T division device

The invention claimed is:

1. A method for a multitrack provision of web-like interleaved sheet material at a cutting region,
   the interleaved sheet material being ejected into the cutting region in an ejection direction;
   wherein products are conveyed on multiple tracks into the cutting region and cut into slices in the cutting region;
   wherein interleaved sheets are introduced under a slice or between two slices, the interleaved sheets being cut off from the provided interleaved sheet material in the cutting region; and
   wherein a normal length of the interleaved sheets in the ejection direction is predefined, the normal length being fixed during the cutting operation, the method comprising:
      removing the interleaved sheet material from at least two material stores, each of the at least two material stores being assigned to at least one of the multiple tracks;
      cutting off the interleaved sheets, each of the interleaved sheets having a respective actual length in the ejection direction; and
      impacting the material consumption of at least one of the material stores by cutting off the interleaved sheets having the respective actual length that is varied with respect to the normal length.

2. The method in accordance with claim 1, wherein the material consumption of the at least one material store is impacted during the cutting operation in dependence on residual quantities in the material stores.

3. The method in accordance with claim 1, wherein the material webs are ejected into the cutting region during an ejection time period, wherein the respective actual lengths of the interleaved sheets are varied by changing a duration of the ejection time period and/or by changing the speed at which the respective material web is ejected into the cutting region.

4. The method in accordance with claim 1, wherein the actual lengths of the interleaved sheets are varied to the extent that residual quantities in the material stores are at least approximately the same size at all times or at the latest when the material stores have at least largely been consumed or when a predefined or predefinable value for the residual quantities has been reached or when a predefined or predefinable condition relating to the cutting operation has been satisfied.

5. The method in accordance with claim 1, wherein actual the lengths of the interleaved sheets are varied such that a size of a residual quantity in a first of the at least two material stores approaches a size of a residual quantity in a second of the at least two material stores.

6. The method in accordance with claim 1, wherein the actual lengths of the interleaved sheets are varied in time during the cutting operation.

7. The method in accordance with claim 1, wherein portions comprising a plurality of slices with interleaved sheets are built, wherein the interleaved sheets of a respective portion are cut off with equal respective actual lengths.

8. The method in accordance with claim 1, wherein the respective actual lengths of interleaved sheets having a respective actual length that is varied with respect to the normal length are smaller than the normal length.

9. The method in accordance with claim 1, wherein the material consumption of the at least one material store is impacted by cutting off further interleaved sheets with a respective actual length that is increased with respect to the normal length in the at least one assigned track;
   while the material consumption of at least one other of the at least two material stores is kept constant by cutting off further interleaved sheets with respective actual lengths that are equal to the normal length in the at least one assigned track,
   or while the material consumption of the at least one other of the at least two material stores is impacted by cutting off further interleaved sheets with respective actual lengths that are reduced with respect to the normal length.

10. The method in accordance with claim 1, wherein the actual lengths of the interleaved sheets are reduced such that the front end of at least one interleaved sheet or of some interleaved sheets is disposed between the respective directly adjacent slices.

11. The method in accordance with claim 1, wherein residual quantities in the material stores are determined by means of a measurement device and are communicated to a control device.

12. The method in accordance with claim 1, wherein the respective diameter of a material roll forming the material store is measured as a measure for residual quantities in the material stores.

13. The method in accordance with claim 1, wherein the respective weight of the material store is measured as a measure for residual quantities in the material stores.

14. The method in accordance with claim 1, wherein the respective length of the material web which passed through a measurement point arranged downstream of the material store is measured as a measure for residual quantities in the material stores.

15. The method in accordance with claim 1, wherein a measure for a size of residual quantities in the material stores is determined.

16. The method in accordance with claim 15, wherein the number of revolutions of at least one component or the power consumption of a removal device which removes the material web from the material store, is measured as the measure for residual quantities in the material stores.

17. The method in accordance with claim 1, wherein at least some portions which each comprise a plurality of slices having interleaved sheets are checked as to whether the length changes of the interleaved sheets are within predefinable or predefined limits.

\* \* \* \* \*